United States Patent
Yamanashi et al.

(10) Patent No.: US 11,780,032 B2
(45) Date of Patent: Oct. 10, 2023

(54) LASER MACHINING APPARATUS AND LASER MACHINING METHOD

(71) Applicant: Amada Co., Ltd., Kanagawa (JP)

(72) Inventors: Takaaki Yamanashi, Kanagawa (JP); Koji Funaki, Kanagawa (JP); Akihiko Sugiyama, Kanagawa (JP); Takehiko Shigefuji, Kanagawa (JP)

(73) Assignee: Amada Co., Ltd., Kangawa (JP)

( * ) Notice: Subject to any disclaimer, the term of this patent is extended or adjusted under 35 U.S.C. 154(b) by 226 days.

(21) Appl. No.: 17/263,332

(22) PCT Filed: Jul. 5, 2019

(86) PCT No.: PCT/JP2019/026806
§ 371 (c)(1),
(2) Date: Jan. 26, 2021

(87) PCT Pub. No.: WO2020/026701
PCT Pub. Date: Feb. 6, 2020

(65) Prior Publication Data
US 2021/0187665 A1 Jun. 24, 2021

(30) Foreign Application Priority Data

Jul. 31, 2018 (JP) .................. 2018-143651

(51) Int. Cl.
*B23K 26/38* (2014.01)
*B23K 26/082* (2014.01)
(Continued)

(52) U.S. Cl.
CPC .......... *B23K 26/38* (2013.01); *B23K 26/0643* (2013.01); *B23K 26/082* (2015.10);
(Continued)

(58) Field of Classification Search
CPC .............. B23K 37/0408; B23K 26/082; B23K 26/1464; B23K 26/38; B23K 26/0643; B23K 37/0235; B23K 26/14
See application file for complete search history.

(56) References Cited

U.S. PATENT DOCUMENTS

| 5,984,159 | A | 11/1999 | Ostendarp et al. |
| 2003/0132208 | A1* | 7/2003 | Cutler .................. B23K 26/389 |
| | | | 219/121.72 |

(Continued)

FOREIGN PATENT DOCUMENTS

| JP | 2000-141070 A | 5/2000 |
| JP | 2005-279730 A | 10/2005 |

(Continued)

OTHER PUBLICATIONS

International Search Report for corresponding Application No. PCT/JP2019/026806, dated Aug. 6, 2019.
Written Opinion for corresponding Application No. PCT/JP2019/026806, dated Aug. 6, 2019.

(Continued)

*Primary Examiner* — Thien S Tran
(74) *Attorney, Agent, or Firm* — Renner, Otto, Boisselle & Sklar, LLP

(57) ABSTRACT

A control device controls a beam vibrating mechanism to vibrate a laser beam in a C-shaped vibration pattern in which a beam spot is moved from a first irradiation position at a front end in a cutting advancing direction to a second irradiation position at a rear side and displaced in an orthogonal direction to the cutting advancing direction, and is moved from the second irradiation position to a third irradiation position at a front end and displaced in the orthogonal direction to the cutting advancing direction, and movement from the first irradiation position to the third irradiation position via the second irradiation position, and (Continued)

movement from the third irradiation position to the first irradiation position via the second irradiation position are repeated. The control device performs control to cut the sheet metal by causing beam spots in the first to third irradiation positions to overlap one another.

6 Claims, 8 Drawing Sheets

(51) Int. Cl.
    *B23K 26/06*       (2014.01)
    *B23K 26/08*       (2014.01)
    *B23K 101/18*     (2006.01)
    *B23K 103/04*     (2006.01)

(52) U.S. Cl.
    CPC ...... *B23K 26/0876* (2013.01); *B23K 2101/18* (2018.08); *B23K 2103/05* (2018.08)

(56) References Cited

U.S. PATENT DOCUMENTS

| | | | |
|---|---|---|---|
| 2015/0014889 A1* | 1/2015 | Goya | B29C 59/16 |
| | | | 219/121.72 |
| 2018/0126491 A1 | 5/2018 | Nakagawa | |
| 2018/0169792 A1 | 6/2018 | Sako et al. | |

FOREIGN PATENT DOCUMENTS

| | | |
|---|---|---|
| JP | 5397768 B2 | 1/2014 |
| JP | 5840322 B2 | 1/2016 |
| JP | 6071640 B2 | 2/2017 |
| WO | 2016/194322 A1 | 12/2016 |

OTHER PUBLICATIONS

Extended European Search Report for corresponding EP Application No. 19844515.7 dated Oct. 14, 2021.

* cited by examiner fx = 1500 Hz, x-DIRECTION fx = 1500 Hz, y-DIRECTION fx = 2000 Hz, x-DIRECTION fx = 2000 Hz, y-DIRECTION

LASER MACHINING APPARATUS AND LASER MACHINING METHOD

TECHNICAL FIELD

The present disclosure relates to a laser machining apparatus and a laser machining method that machine sheet metal made of stainless steel by a laser beam.

BACKGROUND ART

Laser machining apparatuses that cut sheet metal by laser beams emitted from laser oscillators, and produce products having predetermined shapes are widely used. In recent years, as the laser oscillator that emits a laser beam used in a laser machining apparatus, a fiber laser oscillator or a direct diode laser oscillator (DDL oscillator) that is compact and low cost has been more widely used as compared with a $CO_2$ laser oscillator that is large and high cost.

The wavelength of the laser beam emitted by a $CO_2$ laser oscillator is approximately 10 μm, while the wavelength of the laser beam emitted by a fiber laser oscillator or a DDL oscillator is approximately 1 μm. Accordingly, a beam waist of the laser beam emitted by the fiber laser oscillator or a DDL oscillator is small, and a kerf width of a groove formed in a periphery of the product by irradiation of the laser beam is narrow.

CITATION LIST

Patent Literature

Patent Literature 1: Japanese Patent Application Laid-Open Publication No. 2005-279730

SUMMARY

The conventional laser machining apparatuses each using the laser oscillator that emits a laser beam in a 1 μm band cut sheet metal made of stainless steel in a defocused state where the focus point of the laser beams is located above or below the top surface of the sheet metal. In this way, it is possible to cut the sheet metal even if the plate thickness is 3 mm or more by widening the kerf width.

However, cutting by the conventional laser machining apparatuses and laser machining methods has the problem that the surface roughness of the cut surface is poor, much dross adheres to the cut surface, and the cut surface quality is low. A laser machining apparatus and a laser machining method that can cut sheet metal made of stainless steel by a laser beam while improving quality of a cut surface are required.

According to a first aspect of one or more embodiments, a laser machining apparatus is provided, the laser machining apparatus including a machining head configured to emit a laser beam for cutting sheet metal of stainless steel, a moving mechanism configured to relatively move the machining head with respect to a surface of the sheet metal, a beam vibrating mechanism configured to vibrate the laser beam in both a parallel direction with a cutting advancing direction of the sheet metal and an orthogonal direction orthogonal to the cutting advancing direction, when the sheet metal is cut by the machining head being relatively moved by the moving mechanism, and a control device configured to control the moving mechanism and the beam vibrating mechanism, wherein the control device controls the beam vibrating mechanism to vibrate the laser beam in a C-shaped vibration pattern, as a vibration pattern of the laser beam by only the beam vibrating mechanism, the vibration pattern including no movement of the laser beam by relative movement of the machining head, in which a beam spot on the surface of the sheet metal is moved from a first irradiation position at a front end in the cutting advancing direction to a second irradiation position at a rear side in the cutting advancing direction and displaced in an orthogonal direction to the cutting advancing direction, and is moved from the second irradiation position to a third irradiation position at a front end in the cutting advancing direction and displaced in an orthogonal direction to the cutting advancing direction, and movement from the first irradiation position to the third irradiation position via the second irradiation position, and movement from the third irradiation position to the first irradiation position via the second irradiation position are repeated, and performs control to cut the sheet metal by causing a beam spot in the first irradiation position, a beam spot in the second irradiation position, and a beam spot in the third irradiation position to overlap one another, when the machining head is relatively moved by the moving mechanism while the laser beam is vibrated in the C-shaped vibration pattern.

According to a second aspect of one or more embodiments, a laser machining method is provided, the laser machining method including emitting a laser beam for cutting sheet metal of stainless steel from a machining head, and irradiating the sheet metal, cutting the sheet metal by relatively moving the machining head by a moving mechanism with respect to a surface of the sheet metal, vibrating, by a beam vibrating mechanism, the laser beam in both a parallel direction with a cutting advancing direction of the sheet metal and an orthogonal direction orthogonal to the cutting advancing direction when the sheet metal is cut, controlling the beam vibrating mechanism to vibrate the laser beam in a C-shaped vibration pattern, as a vibration pattern of the laser beam by only the beam vibrating mechanism, the vibration pattern including no movement of the laser beam by relative movement of the machining head, in which a beam spot on the surface of the sheet metal is moved from a first irradiation position at a front end in the cutting advancing direction to a second irradiation position at a rear side in the cutting advancing direction and displaced in an orthogonal direction to the cutting advancing direction, and is moved from the second irradiation position to a third irradiation position at a front end in the cutting advancing direction and displaced in an orthogonal direction to the cutting advancing direction, and movement from the first irradiation position to the third irradiation position via the second irradiation position, and movement from the third irradiation position to the first irradiation position via the second irradiation position are repeated, and performing control to cut the sheet metal by causing a beam spot in the first irradiation position, a beam spot in the second irradiation position, and a beam spot in the third irradiation position to overlap one another, when the machining head is relatively moved by the moving mechanism while the laser beam is vibrated in the C-shaped vibration pattern.

According to the laser machining apparatus and the laser machining method of one or more embodiments, it is possible to cut the sheet metal made of stainless steel with good quality of a cut surface by the laser beam.

DESCRIPTION OF EMBODIMENT

Figure 1:
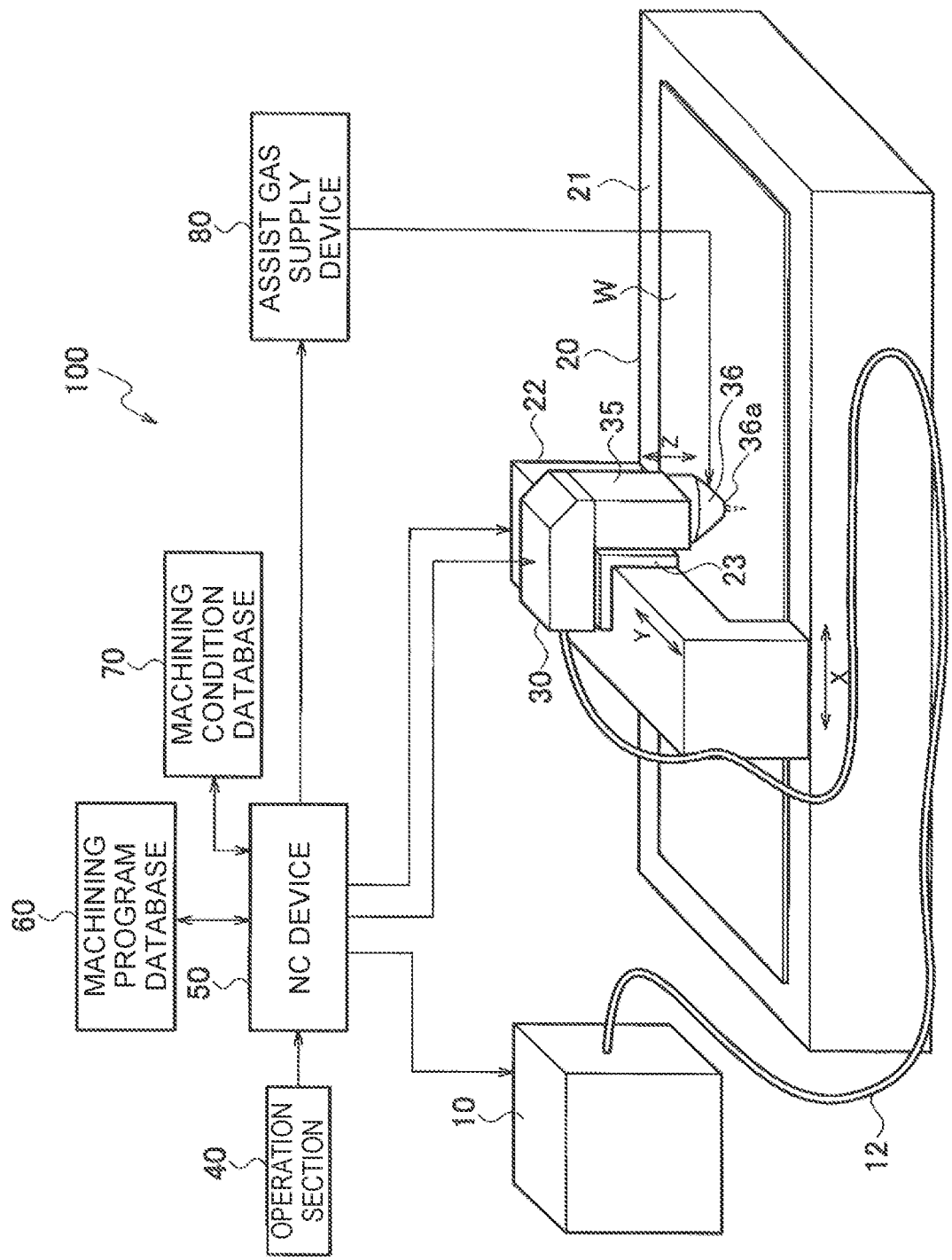
FIG. 1 is a diagram illustrating an entire configuration example of a laser machining apparatus of one or more embodiments.

Hereinafter, a laser machining apparatus and a laser machining method of one or more embodiments will be described with reference to the accompanying drawings. In FIG. 1, a laser machining apparatus 100 includes a laser oscillator 10 that generates and emits a laser beam, a laser machining unit 20, a process fiber 12 that transmits the laser beam emitted by the laser oscillator 10 to the laser machining unit 20.

Further, the laser machining apparatus 100 includes an operation section 40, a NC device 50, a machining program database 60, a machining condition database 70, and an assist gas supply device 80. The NC device 50 is an example of a control device that controls respective parts of the laser machining apparatus 100.

As the laser oscillator 10, a laser oscillator that amplifies an excitation beam emitted from a laser diode to emit a laser beam of a predetermined wavelength, or a laser oscillator that directly uses a laser beam emitted by a laser diode is preferable. The laser oscillator 10 is, for example, a solid laser oscillator, a fiber laser oscillator, a disk laser oscillator, or a direct diode laser oscillator (DDL oscillator).

The laser oscillator 10 emits a laser beam in a band of 1 μm with a wavelength of 900 nm to 1100 nm. Taking a fiber laser oscillator and a DDL oscillator as examples, the fiber laser oscillator emits a laser beam with a wavelength of 1060 nm to 1080 nm, and the DDL oscillator emits a laser beam with a wavelength of 910 nm to 950 nm.

The laser machining unit 20 has a machining table 21 where sheet metal W to be machined is placed, a gate-type X-axis carriage 22, a Y-axis carriage 23, a collimator unit 30 fixed to the Y-axis carriage 23, and a machining head 35. The sheet metal W is made of a stainless steel, and a plate thickness is 3 mm to 15 mm, for example.

The X-axis carriage 22 is configured to be movable in an X-axis direction on the machining table 21. The Y-axis carriage 23 is configured to be movable in a Y-axis direction perpendicular to the X-axis on the X-axis carriage 22. The X-axis carriage 22 and the Y-axis carriage 23 function as a moving mechanism that moves the machining head 35 in the X-axis direction, the Y-axis direction, or an arbitrary composition direction of an X-axis and a Y-axis, along a surface of the sheet metal W.

Instead of moving the machining head 35 along the surface of the sheet metal W, a position of the machining head 35 may be fixed, and the sheet metal W may be configured to move. The laser machining apparatus 100 can include the moving mechanism that moves the machining head 35 relatively to the surface of the sheet metal W.

To the machining head 35, a nozzle 36 that has a circular opening 36a at a tip end portion, and emits a laser beam from the opening 36a is attached. The sheet metal W is irradiated with the laser beam emitted from the opening 36a of the nozzle 36. The assist gas supply device 80 supplies nitrogen to the machining head 35 as assist gas. At a time of machining the sheet metal W, the assist gas is blown to the sheet metal W from the opening 36a.

Figure 2:
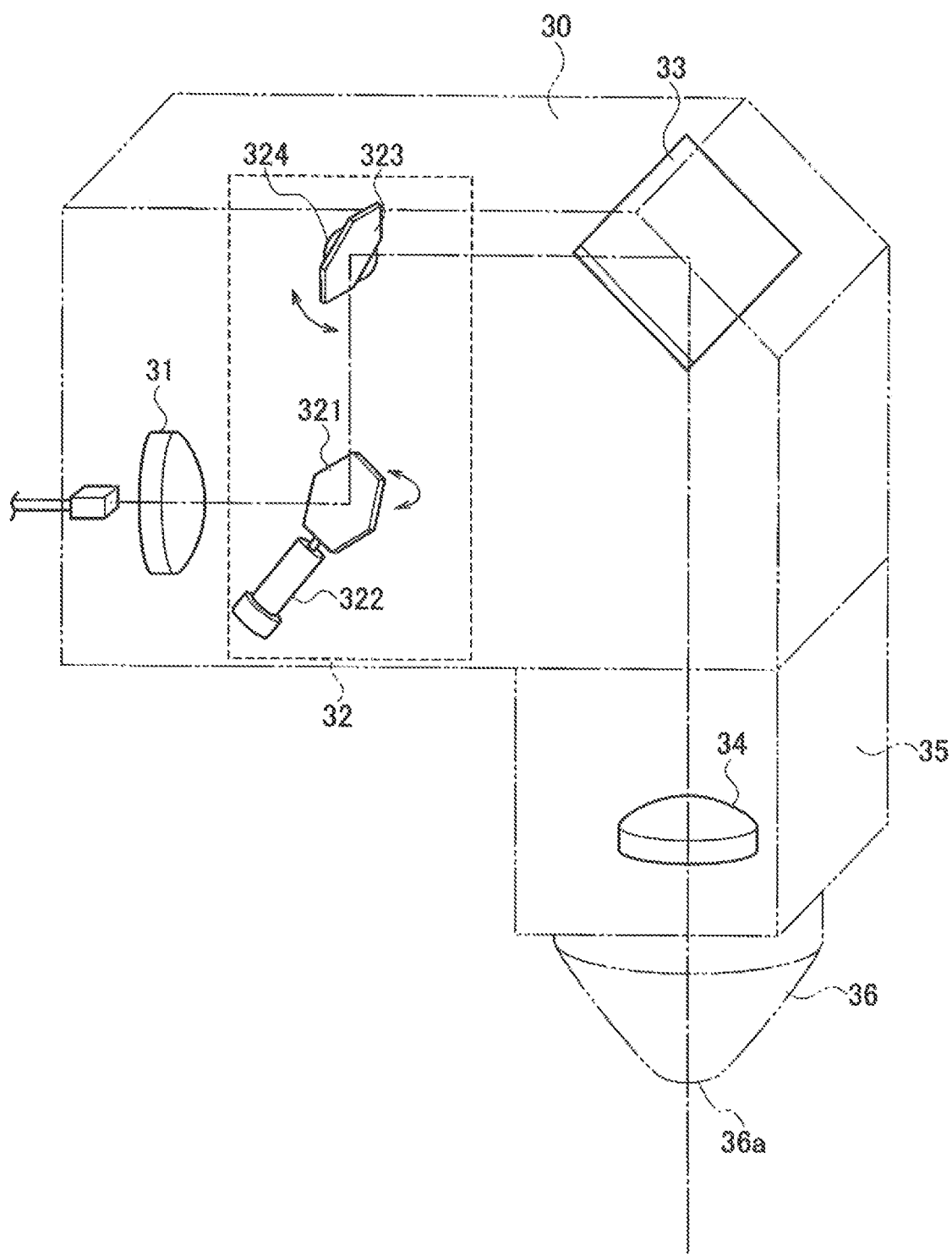
FIG. 2 is a perspective view illustrating detailed configuration examples of a collimator unit and a machining head in the laser machining apparatus of one or more embodiments.

As illustrated in FIG. 2, the collimator unit 30 includes a collimation lens 31 that converts a divergent laser beam emitted from the process fiber 12 into a parallel laser beam (collimated laser beam). Further, the collimator unit 30 includes a galvano scanner unit 32, and a bend mirror 33 that reflects a laser beam emitted from the galvano scanner unit 32 toward a lower part in a Z-axis direction perpendicular to the X-axis and the Y-axis. The machining head 35 includes a focusing lens 34 that focuses the laser beam reflected by the bend mirror 33, and irradiates the sheet metal W.

The laser machining apparatus 100 is centered so that the laser beam emitted from the opening 36a of the nozzle 36 is located at a center of the opening 36a. In a regular state, the laser beam is emitted from the center of the opening 36a. The galvano scanner unit 32 functions as a beam vibrating mechanism that vibrates the laser beam that advances in the machining head 35 and is emitted from the opening 36a, in the opening 36a. How the galvano scanner unit 32 vibrates the laser beam will be described later.

The galvano scanner unit 32 has a scanning mirror 321 that reflects the laser beam emitted from the collimation lens 31, and a drive section 322 that rotates the scanning mirror 321 to a predetermined angle. Further, the galvano scanner unit 32 has a scanning mirror 323 that reflects the laser beam emitted from the scanning mirror 321, and a drive section 324 that rotates the scanning mirror 323 to a predetermined angle.

The drive sections 322 and 324 can reciprocally vibrate the scanning mirrors 321 and 323 within a predetermined angle range respectively based on control by the NC device 50. By reciprocally vibrating either one or both of the scanning mirror 321 and scanning mirror 323, the galvano scanner unit 32 vibrates the laser beam with which the sheet metal W is irradiated.

The galvano scanner unit 32 is one example of the beam vibrating mechanism, and the beam vibrating mechanism is not limited to the galvano scanner unit 32 having a pair of scanning mirrors.

Figure 3:
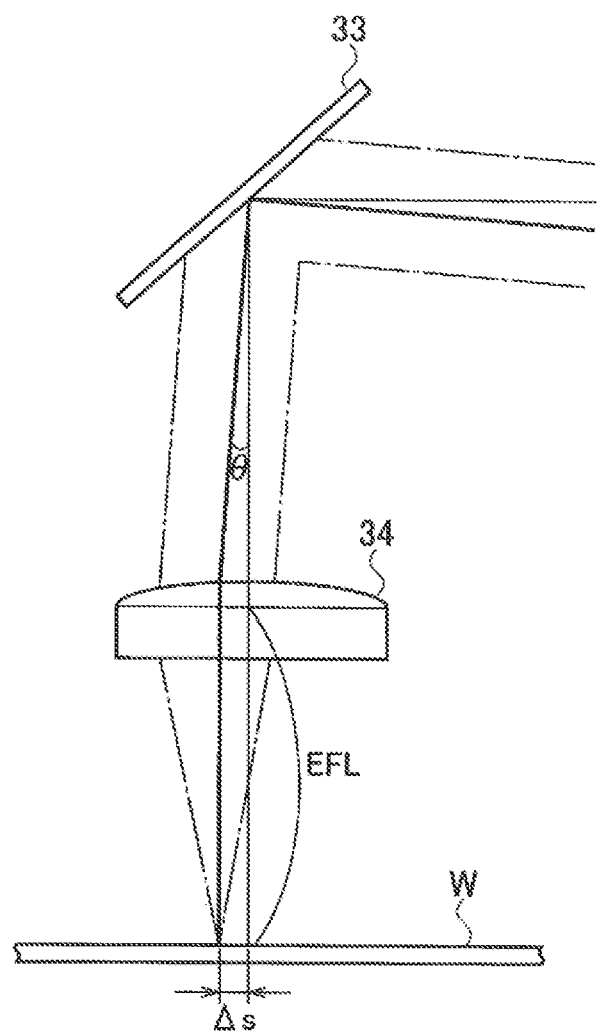
FIG. 3 is a diagram for explaining a displacement of an irradiation position of a laser beam to sheet metal by a beam vibrating mechanism.

FIG. 3 illustrates a state where either one or both of the scanning mirror 321 and the scanning mirror 323 is or are tilted, and a position of the laser beam with which the sheet metal W is irradiated is displaced. In FIG. 3, a fine solid line that is bent by the bend mirror 33 and passes through the focusing lens 34 shows an optical axis of the laser beam at the time of the regular state of the laser machining apparatus 100.

Note that, in detail, an angle of the optical axis of the laser beam that is incident on the bend mirror 33 changes by an operation of the galvano scanner unit 32 located in front of the bend mirror 33, and the optical axis deviates from a center of the bend mirror 33. In FIG. 3, for simplification, incident positions of the laser beams onto the bend mirror 33 are assumed to be same positions before and after the operation of the galvano scanner unit 32.

The optical axis shown by the fine solid line is assumed to be displaced to a position shown by a thick solid line by the action by the galvano scanner unit 32. When the laser beam reflected by the bend mirror 33 is assumed to incline at an angle θ, an irradiation position of the laser beam on the sheet metal W is displaced by a distance Δs. When a focal length of the focusing lens 34 is EFL (Effective Focal Length), the distance Δs is calculated by EFL×sin θ.

If the galvano scanner unit 32 inclines the laser beam at the angle θ in an opposite direction to a direction shown in FIG. 3, the irradiation position of the laser beam on the sheet metal W can be displaced by the distance Δs in an opposite direction to the direction shown in FIG. 3. The distance Δs is a distance less than a radius of the opening 36a, and is preferably a distance less than or equal to a maximum distance when the maximum distance is a distance obtained by subtracting a predetermined margin from the radius of the opening 36a.

The NC device 50 can vibrate the laser beam in a predetermined direction within a plane of the sheet metal W by controlling the drive sections 322 and 324 of the galvano scanner unit 32. By vibrating the laser beam, it is possible to vibrate a beam spot formed on a surface of the sheet metal W.

In the laser machining apparatus 100 configured as above, the NC device 50 reads a machining program from the machining program database 60, and selects any of a plurality of machining conditions stored in the machining condition database 70. The NC device 50 controls the laser machining apparatus 100 to machine the sheet metal W based on the read machining program and the selected machining condition. The laser machining apparatus 100 cuts the sheet metal W by the laser beam emitted from the laser oscillator 10 and produces a product having a predetermined shape.

Figure 4:
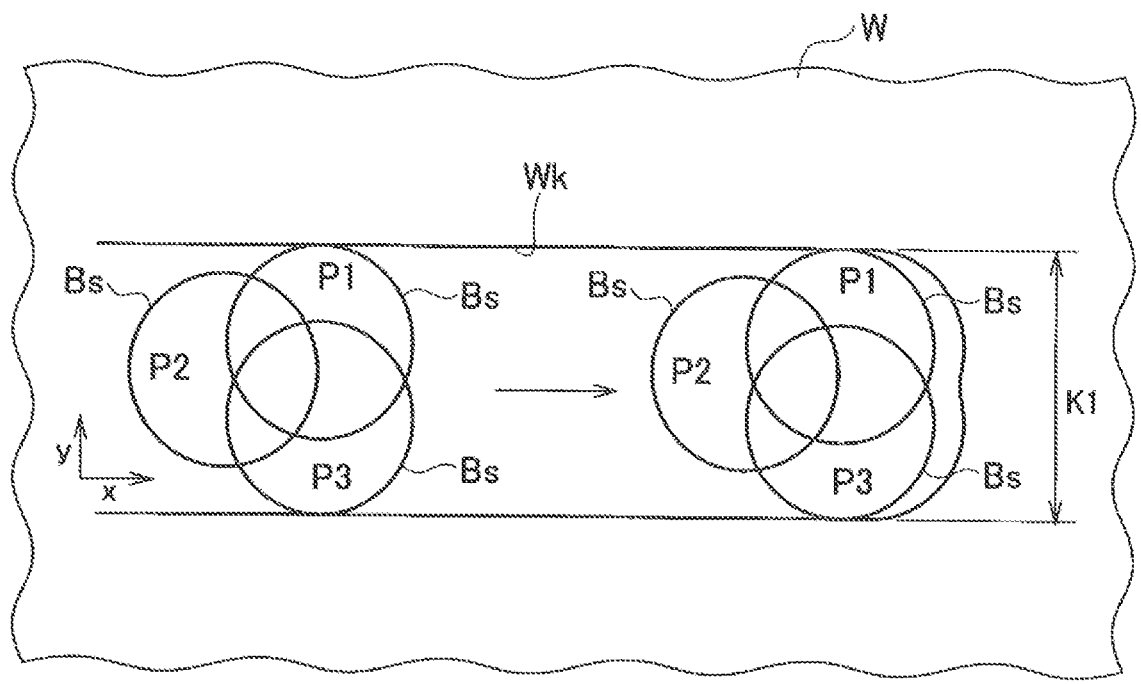
FIG. 4 is a diagram illustrating a C-shaped vibration pattern of the laser beam by only the beam vibrating mechanism.

In one or more embodiments, the galvano scanner unit 32 vibrates the laser beam as illustrated in FIG. 4. A parallel direction with the cutting advancing direction of the sheet metal W is referred to as an x-direction, and an orthogonal direction orthogonal to the x-direction within a plane of the sheet metal W is referred to as a y-direction. A right direction in FIG. 4 is a +x-direction, a left direction is a −x-direction, an upward direction in FIG. 4 is a +y-direction, and a downward direction is a −y-direction. FIG. 4 illustrates a vibration pattern in a state where the machining head 35 is not moved in the x-direction, to make it easier to understand the vibration pattern.

In FIG. 4, explaining the vibration pattern in the state where the machining head 35 is not moved in the x-direction (namely, a state that does not include movement of the laser beam by movement of the position of the machining head 35), the NC device 50 controls the galvano scanner unit 32 to vibrate a beam spot Bs as follows.

When the beam spot Bs is assumed to be located at an irradiation position P1 (first irradiation position), the galvano scanner unit 32 moves the beam spot Bs located in the irradiation position P1 in the −x-direction and the −y-direction to locate the beam spot Bs in an irradiation position P2 (second irradiation position). The galvano scanner unit 32 subsequently moves the beam spot Bs located in the irradiation position P2 in the +x-direction and the −y-direction to locate the beam spot Bs in an irradiation position P3 (third irradiation position).

Further, the galvano scanner unit 32 moves the beam spot Bs located in the irradiation position P3 in the −x-direction and the +y-direction to locate the beam spot Bs in the irradiation position P2, and subsequently moves the beam spot Bs in the +x-direction and the +y-direction to locate the beam spot Bs in the irradiation position P1.

In this way, the galvano scanner unit 32 alternately locates the beam spot Bs in the two irradiation positions P1 and P3 that are same in the x-direction but are different in the y-direction. The irradiation positions P1 and P3 are front end positions in the cutting advancing direction of the beam spot Bs, and are the front end positions in the vibration pattern.

Further, when the galvano scanner unit 32 moves the beam spot Bs from the irradiation position P1 to the irradiation position P3, and moves the beam spot Bs from the irradiation position P3 to the irradiation position P1, the galvano scanner unit 32 causes the beam spot Bs to pass through the irradiation position P2 that is a position at a rear side in the cutting advancing direction from the positions in the x-direction of the irradiation positions P1 and P3, and is a middle position of the positions in the y-direction of the irradiation positions P1 and P3. The irradiation position P2 is a rear end position in the vibration pattern.

A vibration pattern in which the laser beam is vibrated in both the x-direction and the y-direction illustrated in FIG. 4 will be referred to as a C-shaped vibration pattern. The C-shaped vibration pattern is a vibration pattern in which the laser beam is vibrated in both the x-direction and the y-direction.

Figure 5:
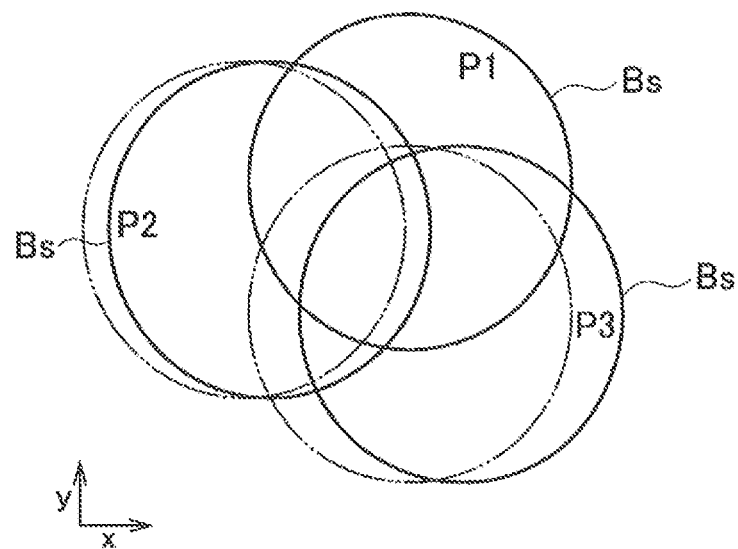
FIG. 5 is a diagram illustrating an actual C-shaped vibration pattern at a time of moving the machining head in a cutting advancing direction.

In reality, the laser beam is vibrated in the C-shaped vibration pattern while the machining head 35 is moving in the cutting advancing direction, and therefore, as illustrated in FIG. 5, the vibration pattern is a vibration pattern in which a displacement in the cutting advancing direction (x-direction) is added to the vibration pattern illustrated in FIG. 4.

In FIG. 5, the beam spot Bs located in the irradiation position P1 moves in the −x-direction and the −y-direction by displacement of the irradiation position by the galvano scanner unit 32, and moves to the irradiation position P2 that is not shown by a two-dot chain line but is shown by a solid line because the machining head 35 moves in the −x-direction. The beam spot Bs located in the irradiation position P2 moves in the +x-direction and the −y-direction by displacement of the irradiation position by the galvano scanner unit 32, and moves to the irradiation position P3 that is not shown by a two-dot chain line but is shown by a solid line because the machining head 35 moves in the −x-direction.

As illustrated in FIG. 4, when the machining head 35 is moved in the +x-direction while the laser beam is vibrated in the C-shaped vibration pattern, a groove Wk of a kerf width K1 corresponding to a width in the y-direction of the irradiation positions P1 and P3 is formed in the sheet metal W. By vibrating the laser beam in the C-shaped vibration pattern, a wider kerf width can be made as compared with a case where the laser beam is not vibrated in the y-direction.

When the galvano scanner unit 32 moves the beam spot Bs from the irradiation position P1 to the irradiation position P2, when the galvano scanner unit 32 moves the beam spot Bs from the irradiation position P2 to the irradiation position P3, and when the galvano scanner unit 32 moves the beam spot Bs in an opposite direction to this, the beam spot Bs is preferably moved in a parabolic fashion. The galvano scanner unit 32 may move the beam spot Bs substantially rectilinearly between the irradiation position P1 and the irradiation position P2, and between the irradiation position P2 and the irradiation position P3.

Figure 6:
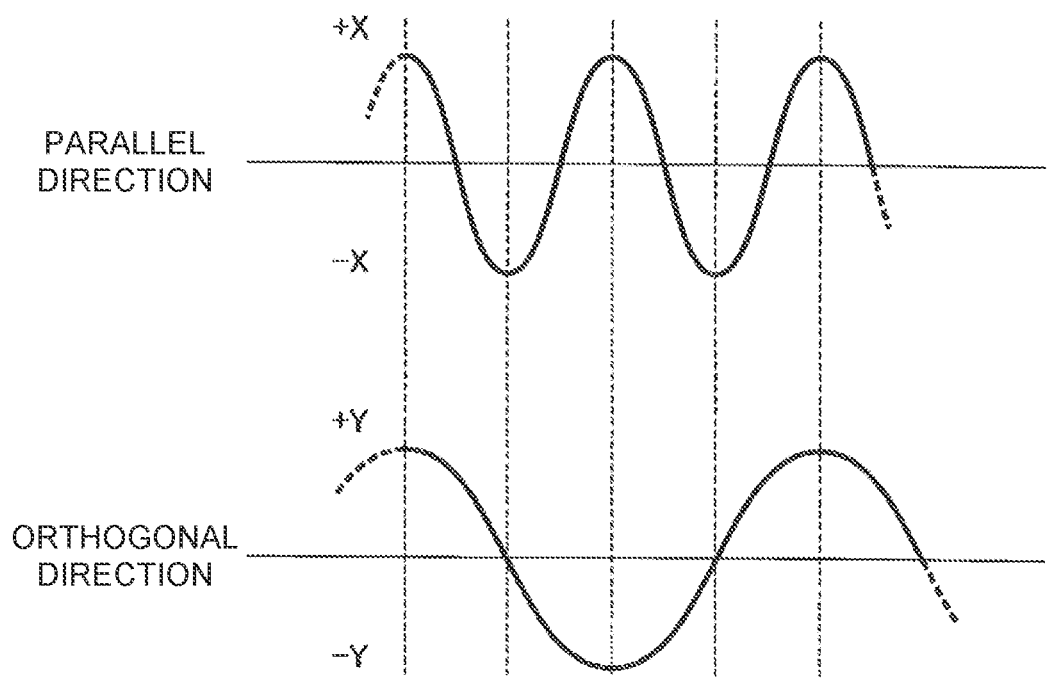
FIG. 6 is a diagram illustrating phases and frequencies of vibrations in a parallel direction and an orthogonal direction of the C-shaped vibration pattern illustrated in FIG. 4.

Phases and frequencies of vibrations in the x-direction and the y-direction of the C-shaped vibration pattern illustrated in FIG. 4 can be expressed as in FIG. 6. When a frequency at which the laser beam is vibrated in the x-direction is Fx, and a frequency at which the laser beam is vibrated in the y-direction is Fy, the frequency Fy is ½ of the frequency Fx as is known from FIG. 6. The C-shaped vibration pattern is a vibration pattern in which Fx:Fy is 2:1. The frequency Fx is preferably set at 1000 Hz or more.

By verification of the present inventor, it has been obvious that in order to improve the quality of the cut surface of the sheet metal W, the laser beam is preferably vibrated as follows in a state where the laser beam is displaced with movement of the machining head 35. First, the beam spot Bs located at the front end in the cutting advancing direction in the C-shaped vibration pattern, and the beam spot Bs located at the rear side overlap each other. In other words, the beam spots Bs overlap each other in the irradiation position P1 or P3 and the irradiation position P2 shown in FIG. 5. Second, the two beam spots Bs located at the front end in the cutting advancing direction in the C-shaped vibration pattern overlap each other. In other words, the beam spots Bs overlap each other in the irradiation position P1 and the irradiation position P3 shown in FIG. 5.

Although Patent Literature 1 describes vibrating the laser beam in the C-shaped vibration pattern, the beam spot Bs located at the front end and the beam spot Bs located at the rear side do not overlap each other, and the two beam spots Bs located at the front end also do not overlap each other.

A preferable overlap rate of the beam spots Bs will be described by using FIG. 7 to FIG. 10. The overlap rate is a percentage of overlap in a distance of a diameter of the beam spot Bs in the two irradiation positions of the irradiation positions P1 to P3.

Figure 7:
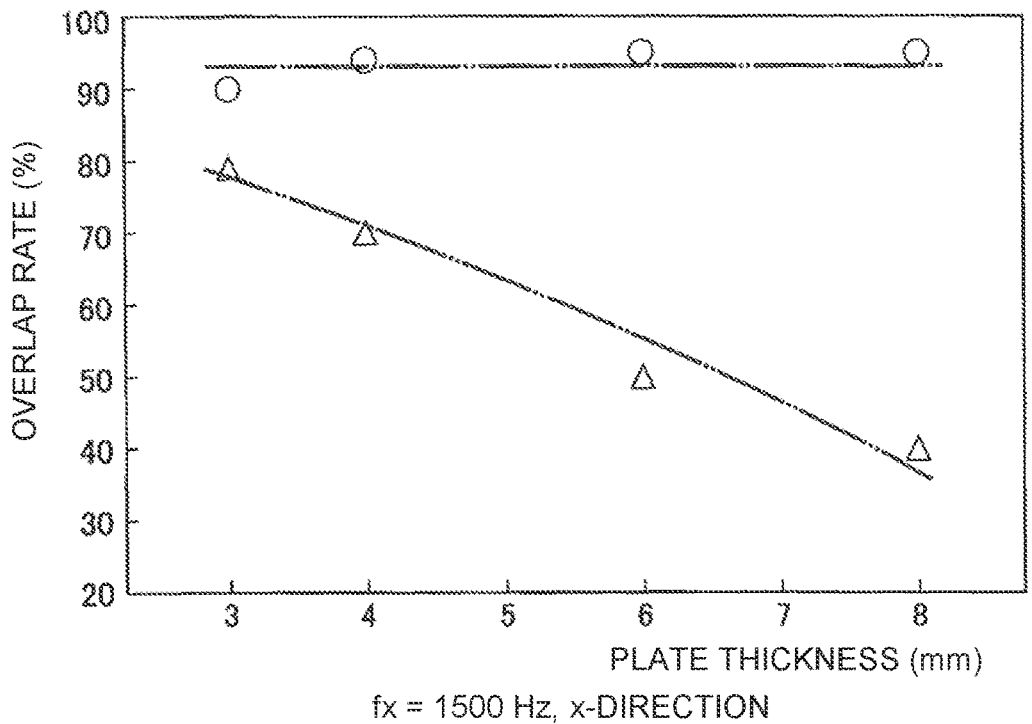
FIG. 7 is a characteristic diagram illustrating a preferable range of an overlap rate of beam spots in a first or third irradiation position and a second irradiation position, when a frequency in a cutting advancing direction of the C-shaped vibration pattern is 1500 Hz.
Figure 8:
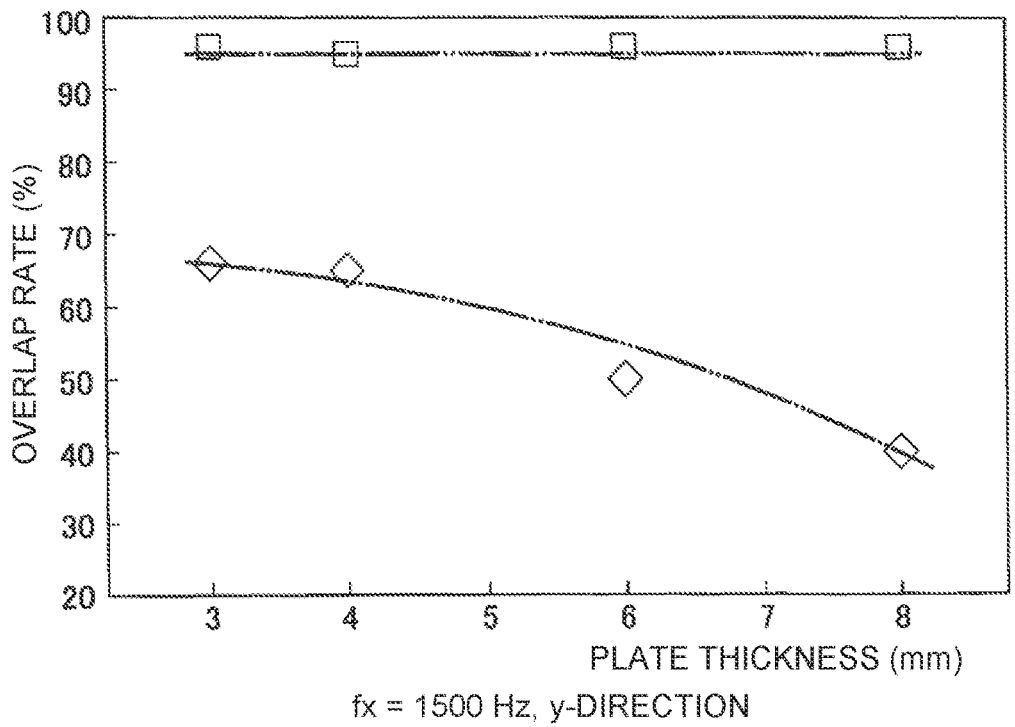
FIG. 8 is a characteristic diagram illustrating a preferable range of an overlap rate of beam spots in the first irradiation position and the third irradiation position, when the frequency in the cutting advancing direction of the C-shaped vibration pattern is 1500 Hz.

FIG. 7 illustrates a preferable range of an overlap rate of the beam spots Bs in the irradiation position P1 or P3 and the irradiation position P2 when the frequency Fx is 1500 Hz. FIG. 8 illustrates a preferable range of an overlap rate of the two beam spots Bs located in the irradiation positions P1 and P3 at the front end in the cutting advancing direction when the frequency Fx is 1500 Hz. Here, the plate thickness of the sheet metal W is set at 3 mm, 4 mm, 6 mm, and 8 mm.

Figure 9:
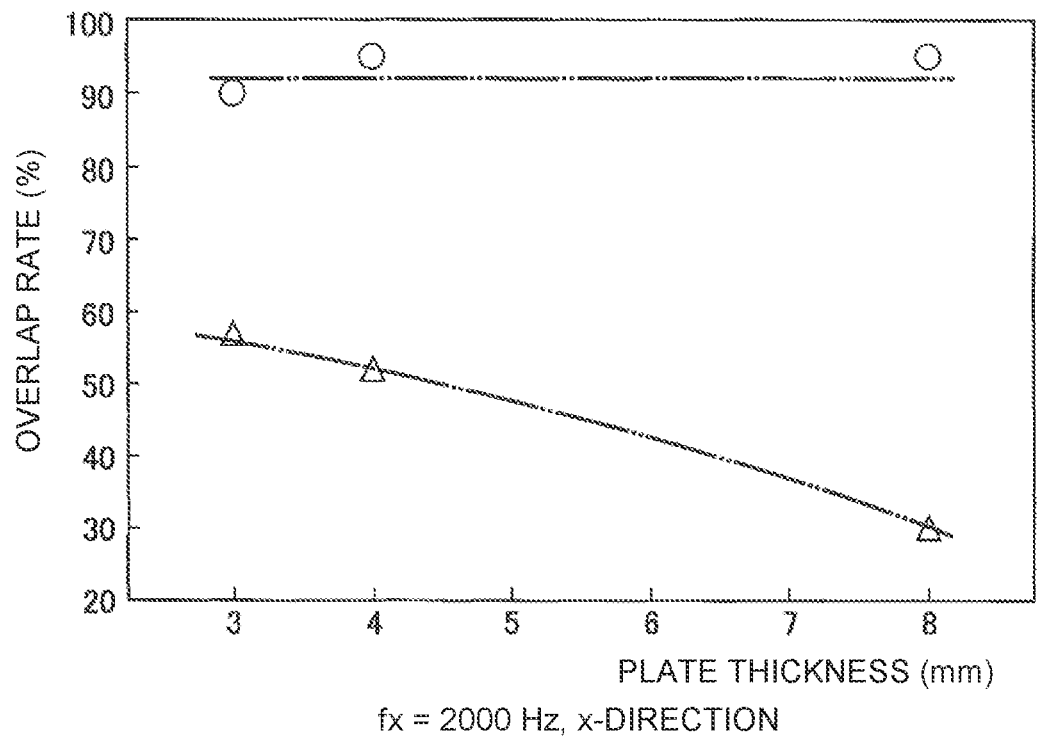
FIG. 9 is a characteristic diagram illustrating a preferable range of an overlap rate of beam spots in the first or third irradiation position and the second irradiation position, when the frequency in the cutting advancing direction of the C-shaped vibration pattern is 2000 Hz.
Figure 10:
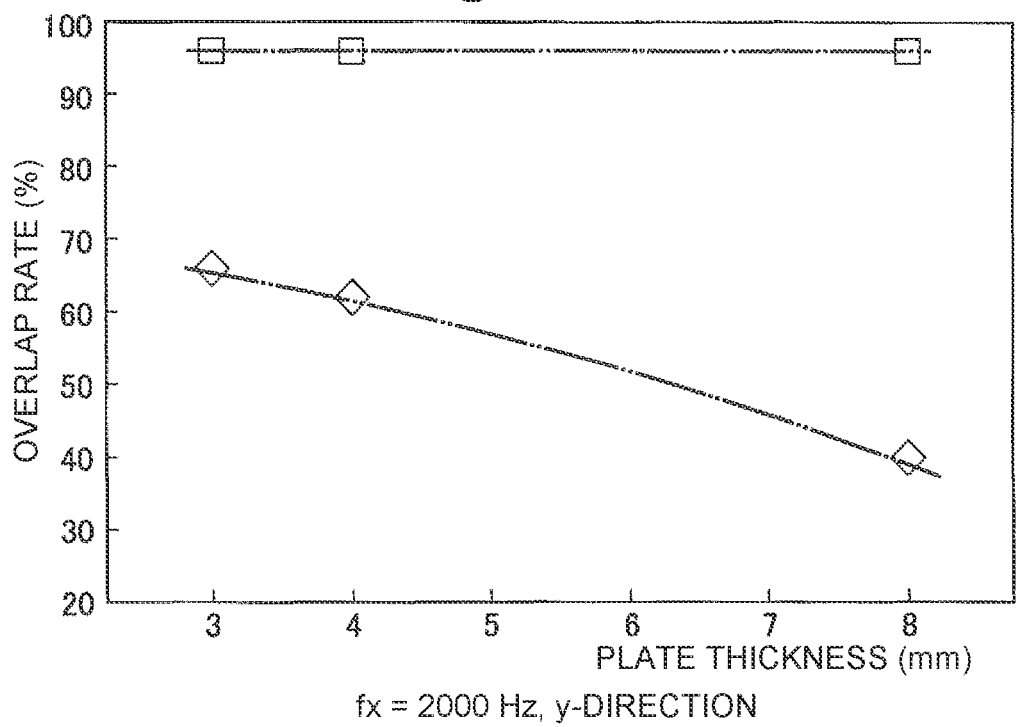
FIG. 10 is characteristic diagram illustrating a preferable range of an overlap rate of beam spots in the first irradiation position and the third irradiation position, when the frequency in the cutting advancing direction of the C-shaped vibration pattern is 2000 Hz.

FIG. 9 illustrates a preferable range of an overlap rate of the beam spots Bs in the irradiation position P1 or P3 and the irradiation position P2 when the frequency Fx is 2000 Hz. FIG. 10 illustrates a preferable range of the overlap rate of the two beam spots Bs located in the irradiation positions P1 and P3 at the front end in the cutting advancing direction when the frequency Fx is 2000 Hz. Here, the plate thickness of the sheet metal W is set at 3 mm, 4 mm, and 8 mm.

In FIG. 7 to FIG. 10, a state where a dross height of dross adhering to the cut surface of the sheet metal W is low is considered to be good quality of the cut surface, and upper limit values and lower limit values of the overlap rates at which good quality of the cut surface is obtained are shown. Specifically, the quality of the cut surface is considered to be good when average dross heights at a time of measuring dross heights at three spots in the cut surface are 20 μm or less, 40 μm or less, 100 μm or less, and 200 μm or less respectively for the plate thicknesses of 3 mm, 4 mm, 6 mm, and 8 mm.

When the overlap rate deviates from a range of the upper limit value and the lower limit value, the quality of the cut surface deteriorates, or the sheet metal W cannot be cut.

In FIG. 7, upper limit values (first upper limit values) of the overlap rates at the time of the plate thickness being 3 mm, 4 mm, 6 mm, and 8 mm are respectively 90%, 94%, 95%, and 95%, and lower limit values (first lower limit values) are respectively 79%, 70%, 50%, and 40%. In FIG. 8, upper limit values (second upper limit values) of the overlap rates at the time of the plate thickness being 3 mm, 4 mm, 6 mm, and 8 mm are respectively 96%, 95%, 96%, and 96%, and lower limit values (second lower limit values) are respectively 66%, 65%, 50%, and 40%.

In FIG. 9, upper limit values (first upper limit values) of the overlap rates at a time of the plate thickness being 3 mm, 4 mm, and 8 mm are respectively 90%, 95%, and 95%, and lower limit values (first lower limit values) are respectively 57%, 52%, and 30%. In FIG. 10, upper limit values (second upper limit values) of the overlap rates at a time of the plate thickness being 3 mm, 4 mm, and 8 mm are respectively 96%, 96%, and 96%, and lower limit values (second lower limit values) are respectively 66%, 62%, and 40%.

As is known from FIG. 7 to FIG. 10, by causing the beam spots Bs to overlap in the irradiation positions P1 to P3, it is possible to cut the sheet metal W of stainless steel with good quality of the cut surface by a laser beam in a band of 1 μm.

As is known from FIG. 7 to FIG. 10, the lower limit value of the overlap rate tends to be larger as the plate thickness of the sheet metal W becomes smaller, and the lower limit value of the overlap rate tends to be smaller as the plate thickness becomes larger. The NC device 50 may control the vibration of the laser beam by the galvano scanner unit 32, and movement of the machining head 35 by the moving mechanism so that the overlap rate is between the lower limit value and the upper limit value according to the plate thickness of the sheet metal W.

The machining condition database 70 preferably stores, according to each of the frequencies Fx, the first upper limit value and the first lower limit value, and the second upper limit value and the second lower limit value set for each of the plate thicknesses of the sheet metal W. The NC device 50 may determine the overlap rate by referring to the machining condition database 70.

Specifically, the NC device 50 reads the first upper limit value and the first lower limit value, and the second upper limit value and the second lower limit value, according to the frequency Fx and the plate thickness of the sheet metal W to be cut, from the machining condition database 70. The NC device 50 may select the overlap rate between the first upper limit value and the first lower limit value, select the overlap rate between the second upper limit value and the second lower limit value, and vibrate and move the laser beam at the respective selected overlap rates.

The first upper limit value and the first lower limit value, and the second upper limit value and the second lower limit value are preferably set for each of the plate thicknesses of the sheet metal W, according to each of the frequencies Fx.

For simplification, the first upper limit value and the first lower limit value, and the second upper limit value and the second lower limit value for each of the plate thicknesses of the sheet metal W that can be used in common in each group composed of a plurality of frequencies Fx may be set. For further simplification, the first upper limit value and the first lower limit value, and the second upper limit value and the second lower limit value for each of the plate thicknesses of the sheet metal W that can be used in common at all the frequencies Fx may be set, though a selectable overlap rate is limited.

When the first upper limit value and the first lower limit value, and the second upper limit value and the second lower limit value are set for each of the frequencies Fx or each group of the frequencies Fx, the NC device 50 may control the vibration of the laser beam and movement of the machining head 35 as follows. The NC device 50 causes the beam spots Bs in the irradiation positions P1 to P3 to overlap one another at the overlap rate between the first upper limit and the first lower limit set in advance and the overlap rate between the second upper limit value and the second lower limit value set in advance, according to the frequency Fx and the plate thickness of the sheet metal W to be cut.

In FIG. 5, the beam spot Bs located in the irradiation position P3 is located in the next irradiation position P2 at the rear side in the cutting advancing direction by vibration of a next cycle, and thereafter is located in the next irradiation position P1 at the front end in the cutting advancing direction. Further, by vibration of a next cycle, the beam spot Bs located in the irradiation position P1 is located in the next irradiation position P2 at the rear side in the cutting advancing direction, and thereafter is located in the next irradiation position P3 at the front end in the cutting advancing direction. The beam spot Bs repeats reciprocal vibration like this.

Figure 11:
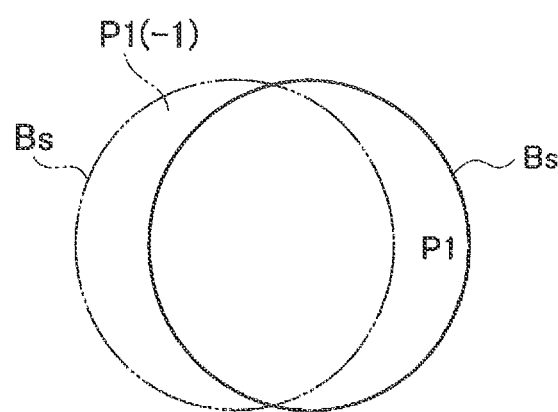
FIG. 11 is a diagram illustrating a state where beam spots overlap in irradiation positions of two cycles that are adjacent.

In FIG. 11, the irradiation position P1 at a cycle directly before the present irradiation position P1 is set as an irradiation position P1 (−1), and the beam spot Bs located in the irradiation position P1 (−1) is shown by a two-dot chain line. In two consecutive cycles, the beam spots Bs in the irradiation positions P1 to P3 overlap. The overlap rate of the beam spots Bs in the two consecutive cycles is preferably 80% or more, and more preferably 90% or more. Here, the overlap rate is also a percentage of overlap in the distance of the diameter of the beam spot Bs.

As above, according to the laser machining apparatus and the laser machining method of one or more embodiments, the sheet metal W made of stainless steel can be cut with good quality of the cut surface by the laser beam.

The present invention is not limited to the one or more embodiments described above, and can be variously changed within the range without departing from the summary of the present invention.

The disclosure of this application relates to the subject described in Japanese Patent Application No. 2018-143651 filed on Jul. 31, 2018, the entire disclosed contents of which are incorporated herein by reference.

The invention claimed is:

1. A laser machining apparatus, comprising:
a machining head configured to emit a laser beam for cutting sheet metal of stainless steel;
a moving mechanism configured to relatively move the machining head with respect to a surface of the sheet metal;
a beam vibrating mechanism configured to vibrate the laser beam in both a parallel direction with a cutting advancing direction of the sheet metal and an orthogonal direction orthogonal to the cutting advancing direction when the sheet metal is cut by the machining head being relatively moved by the moving mechanism; and
a control device configured to control the moving mechanism and the beam vibrating mechanism,
wherein the control device
controls the beam vibrating mechanism to vibrate the laser beam in a C-shaped vibration pattern, as a vibration pattern of the laser beam by only the beam vibrating mechanism, the vibration pattern including no movement of the laser beam by relative movement of the machining head, in which a beam spot on the surface of the sheet metal is moved from a first irradiation position at a front end in the cutting advancing direction to a second irradiation position at a rear side in the cutting advancing direction and displaced in the orthogonal direction, and is moved from the second irradiation position to a third irradiation position at a front end in the cutting advancing direction and displaced in the orthogonal direction, and movement from the first irradiation position to the third irradiation position via the second irradiation position, and movement from the third irradiation position to the first irradiation position via the second irradiation position are repeated, the C-shaped vibration pattern being defined as a vibration pattern in which Fx:Fy is 2:1, where Fx is a frequency for vibrating the laser beam in the cutting advancing direction and Fy is a frequency for vibrating the laser beam in the orthogonal direction, and
performs control to cut the sheet metal by causing a beam spot in the first irradiation position, a beam spot in the second irradiation position, and a beam spot in the third irradiation position to overlap one another, when the machining head is relatively moved by the moving mechanism while the laser beam is vibrated in the C-shaped vibration pattern.

2. The laser machining apparatus according to claim 1,
wherein for each plate thickness of the sheet metal, a first upper limit value and a first lower limit value of an overlap rate of the beam spot in the first or third irradiation position and the beam spot in the second irradiation position, and a second upper limit value and a second lower limit value of an overlap rate of the beam spot in the first irradiation position and the beam spot in the third irradiation position are set, and
the control device controls the beam vibrating mechanism and the moving mechanism to cause the beam spot in the first or third irradiation position and the beam spot in the second irradiation position to overlap at an overlap rate between the first upper limit value and the first lower limit value, and cause the beam spot in the first irradiation position and the beam spot in the third irradiation position to overlap at an overlap rate between the second upper limit value and the second lower limit value, according to a plate thickness of the sheet metal to be cut.

3. The laser machining apparatus according to claim 2,
wherein the first upper limit value and the first lower limit value, and the second upper limit value and the second lower limit value are set for each plate thickness of the sheet metal, according to a frequency in the cutting advancing direction or a group composed of a plurality of frequencies at a time of vibrating the laser beam in the C-shaped vibration pattern, and
the control device controls the beam vibrating mechanism and the moving mechanism to cause the beam spots in the first to third irradiation position to overlap one another at an overlap rate between the first upper limit value and the first lower limit value set in advance, and an overlap rate between the second upper limit value and the second lower limit value set in advance, according to the frequency in the cutting advancing direction and the plate thickness of the sheet metal to be cut.

4. A laser machining method, comprising:

emitting a laser beam for cutting sheet metal of stainless steel from a machining head, and irradiating the sheet metal;

cutting the sheet metal by relatively moving the machining head by a moving mechanism with respect to a surface of the sheet metal;

vibrating, by a beam vibrating mechanism, the laser beam in both a parallel direction with a cutting advancing direction of the sheet metal and an orthogonal direction orthogonal to the cutting advancing direction when the sheet metal is cut;

controlling the beam vibrating mechanism to vibrate the laser beam in a C-shaped vibration pattern, as a vibration pattern of the laser beam by only the beam vibrating mechanism, the vibration pattern including no movement of the laser beam by relative movement of the machining head, in which a beam spot on the surface of the sheet metal is moved from a first irradiation position at a front end in the cutting advancing direction to a second irradiation position at a rear side in the cutting advancing direction and displaced in the orthogonal direction, and is moved from the second irradiation position to a third irradiation position at a front end in the cutting advancing direction and displaced in the orthogonal direction, and movement from the first irradiation position to the third irradiation position via the second irradiation position, and movement from the third irradiation position to the first irradiation position via the second irradiation position are repeated, the C-shaped vibration pattern being defined as a vibration pattern in which Fx:Fy is 2:1, where Fx is a frequency for vibrating the laser beam in the cutting advancing direction and Fy is a frequency for vibrating the laser beam in the orthogonal direction; and performing control to cut the sheet metal by causing a beam spot in the first irradiation position, a beam spot in the second irradiation position, and a beam spot in the third irradiation position to overlap one another, when the machining head is relatively moved by the moving mechanism while the laser beam is vibrated in the C-shaped vibration pattern.

5. The laser machining method according to claim 4, further comprising:

referring to a first upper limit value and a first lower limit value of an overlap rate of the beam spot in the first or third irradiation position and the beam spot in the second irradiation position, and a second upper limit value and a second lower limit value of an overlap rate of the beam spot in the first irradiation position and the beam spot in the third irradiation position set for each plate thickness of the sheet metal; and controlling the beam vibrating mechanism and the moving mechanism to cause the beam spot in the first or third irradiation position and the beam spot in the second irradiation position to overlap at an overlap rate between the first upper limit value and the first lower limit value, and cause the beam spot in the first irradiation position and the beam spot in the third irradiation position to overlap at an overlap rate between the second upper limit value and the second lower limit value, according to a plate thickness of the sheet metal to be cut.

6. The laser machining method according to claim 5, further comprising:

referring to the first upper limit value and the first lower limit value, and the second upper limit value and the second lower limit value set for each plate thickness of the sheet metal, according to a frequency in the cutting advancing direction or a group composed of a plurality of frequencies at a time of vibrating the laser beam in the C-shaped vibration pattern; and controlling the beam vibrating mechanism and the moving mechanism to cause the beam spots in the first to third irradiation positions to overlap one another at an overlap rate between the first upper limit value and the first lower limit value set in advance, and an overlap rate between the second upper limit value and the second lower limit value set in advance, according to the frequency in the cutting advancing direction and the plate thickness of the sheet metal to be cut.

* * * * *